G. L. DEWEY.
LICENSE TAG BRACKET.
APPLICATION FILED NOV. 15, 1919.
1,357,033.
Patented Oct. 26, 1920.
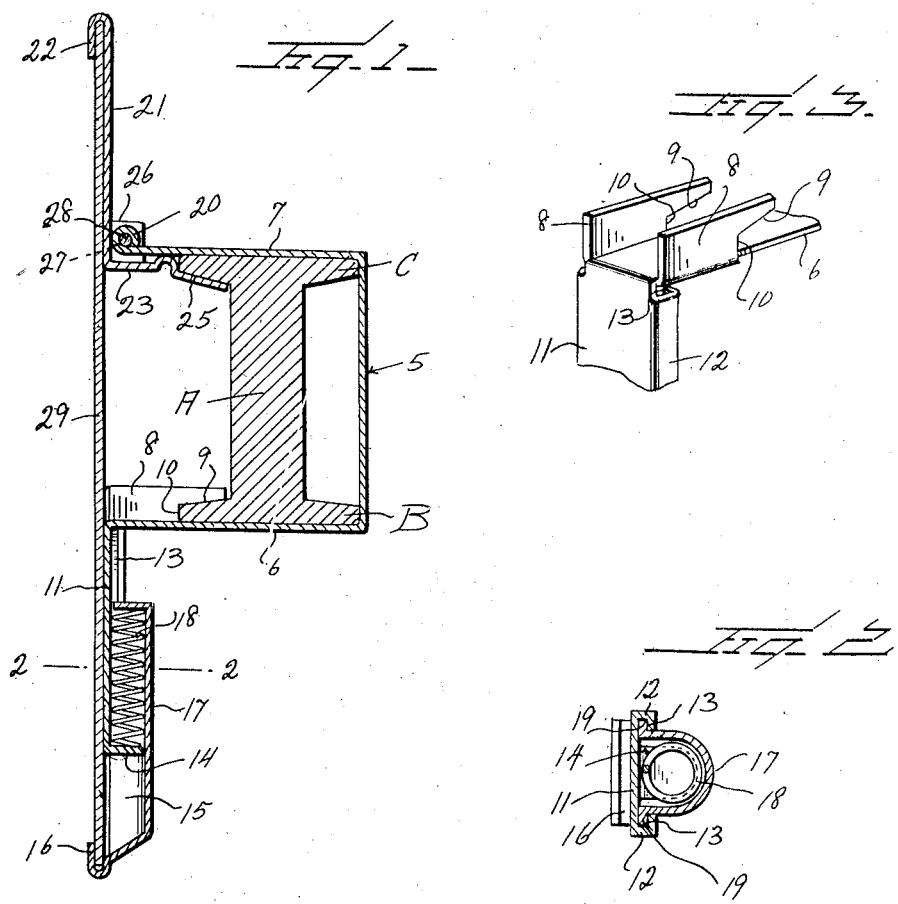
Inventor
G. L. Dewey
By Watson E. Coleman
Attorney

UNITED STATES PATENT OFFICE.

GLENN L. DEWEY, OF MANSFIELD, PENNSYLVANIA, ASSIGNOR OF ONE-THIRD TO DONOVAN W. RUMSEY, OF MAINESBURG, PENNSYLVANIA.

LICENSE-TAG BRACKET.

1,357,033.  Specification of Letters Patent.  Patented Oct. 26, 1920.

Application filed November 15, 1919. Serial No. 338,310.

*To all whom it may concern:*

Be it known that I, GLENN L. DEWEY, a citizen of the United States, residing at Mansfield, in the county of Tioga and State of Pennsylvania, have invented certain new and useful Improvements in License-Tag Brackets, of which the following is a specification, reference being had to the accompanying drawings.

This invention relates to a motor vehicle license tag bracket and has for its object to provide a device of this character which can be instantly applied to the axle of the vehicle to securely hold the license tag.

Another object is the provision of a device of this character which automatically adjusts itself to the size of the license tag supported thereby.

Another object is the provision of a device of this character in which the license tag serves as the means for holding the bracket in engagement with the axle.

Another object is the provision of a device of this character including a pivoted holding arm which readily permits disengagement of the bracket from the axle when the license tag is removed.

A still further object is the provision of a device of this character, the parts of which can be stamped from a small quantity of sheet metal at a low cost.

With these and other objects in view the invention consists in the improved construction and arrangement of parts to be hereinafter more particularly described, fully claimed and illustrated in the accompanying drawings, in which:—

Figure 1 is a vertical and sectional view on my license tag holder applied to a motor vehicle axle, the axle being shown in section.

Fig. 2 is a sectional view taken on the line 2—2 of Fig. 1, and

Fig. 3 is a detail perspective of the means which coöperate with the supporting member to hold the same on the axle.

Referring to the drawings A designates a conventional form of vehicle axle including lower flanges B and upper flanges C which serve to reinforce the axle.

My improved bracket is intended to engage the axle and consists of a supporting member 5 substantially U-shaped, the holding arm 6 of said member being intended to engage the flange B while the arm 7 is intended to engage the flange C of the axle. Projecting from the terminal portion of the arm 6 from each side edge thereof is a wing 8 which is cut away as at 9 to provide a recess 10 through the coöperation of the adjacent portion of the arm 6. These wings are intended to engage the edge of the flange B so that said flange is disposed in the recess 10. An extension 11 extends from the end of the arm 6 in right angular relation thereto. This extension includes flanges 12 from each side thereof. These flanges are folded over upon the extension 11 to provide a channel 13, while projecting from the end of the extension 11 is a lip 14, the lip 14 being also bent in angular relation to the channel portion 13 of the extension.

A holding arm 15 is provided and includes at one end a jaw 16 and has its longitudinal intermediate portion bowed as at 17 to provide a casing in which a compression spring 18 is disposed. The end of the casing portion is closed to prevent disengagement of the spring therefrom, while the side edges of the casing are bent in angular relation thereto to provide flanges 19 for slidable engagement with the grooves 12 of the extension 11. When disposed in this position, the lip 14 is intended to engage the spring adjacent the jaw 16 so that when the holding arm is moved away from the member 5, the lip 14 together with the end of the casing will compress the spring to cause the return of the arm. By this means any size of license tag can be applied to the holder and securely supported thereby in view of the compression spring forcing the holding arm toward the bracket.

The end of the arm 7 is curled upon itself to provide a socket 20 adapted to support the oscillating holding arm 21. This arm includes at one end a jaw 22 and has its opposite end 23 bent in right angular relation to the jaw of said member. The intermediate portion of the end 23 is extended upwardly in offset relation to the main portion of the end 23 so as to provide a recess 25 through the coöperation of said end and the adjacent portion of the arm 7. The recess 25 is provided to receive the flange C of the axle A. Extending from the arm 21 at the junction of said arm with the end 23 is a pair of wings 26 provided with registering openings 27, through which a pin 28 is passed to pivotally connect the arm 21 to the arm 7 through the medium of the socket 20.

In use, a license tag or plate 29 is passed between the jaws 16 and 22, the arm 17 adjusting itself to the width of the plate. By this means the arm 21 is held vertically so that the end 23 thereof engages the flange C and as long as the plate is maintained in engagement with the jaws 16 and 22 it is impossible for the bracket to become disengaged from the axle. When, however, it is desired to change the plate or remove the same, upon disengagement of the plate 29 from the jaws 16 and 22, the oscillating arm 21 is permitted to move on its pivot 28 and disengage the end 23 from the flange C whereupon the supporting member 5 can be readily disengaged from the axle.

One of the important features of this device is the fact that no screws, bolts or like means are used to connect the bracket to the vehicle or the license tag to the bracket, each member coöperating with the other to maintain its proper position, the disengagement of one member also permitting the disengagement of the other member from its supporting means. The novel adjusting arm 17 not only permits the application of license tags to the holder, but serves to frictionally hold said tag in engagement with the bracket, the tag in turn holding the bracket in engagement with the axle. By this means every part of the device coöperates with the other to perform an important function, and as there are no bolts or like fastening means to become loose through vibration, the only way the bracket can be disengaged from the axle and the license tag from the bracket is to manually remove the same.

The invention having been set forth, what is claimed as new and useful is:—

1. The combination with a vehicle axle, of a bracket partially surrounding said axle, a longitudinally movable holding arm carried by one end of said bracket, a laterally movable holding arm carried by the other end of said bracket, and a plate supported by said arms, said plate preventing movement of said arms with respect to each other and the bracket.

2. The combination with a vehicle axle, of a bracket partially surrounding said axle, a holding arm slidably mounted on one end of said bracket for longitudinal movement, an oscillating holding arm pivoted to the other end of said bracket and arranged to oscillate toward and away from the first mentioned holding arm, and a plate supported by said arms, said plate preventing oscillating movement of the oscillating arm to prevent disengagement of the bracket from the axle.

3. The combination with a vehicle axle, of a bracket adapted to engage said axle and partially surround the same, one end of said bracket including an extension, a lip on the end of said extension, a holding arm slidably mounted on the extension, said arm having a jaw on one end, a spring engaged with said lip and the other end of the holding arm, a holding arm pivoted to the other end of the bracket, said arm having a jaw on one end, and a plate mounted between the jaws of the arms, said slidable arm preventing oscillating movement of said oscillating arm through the medium of the plate.

4. The combination with a vehicle axle, of a bracket, wings projecting from one end portion of said bracket in parallel spaced relation to each other, said wings being adapted to hold said end portion in engagement with the axle, an extension on said end portion, an arm slidably mounted on said extension, said arm having a jaw on one end, a holding arm pivoted adjacent one end thereof to the other end of said bracket and overlapping the same, the other end of said holding arm having a jaw, and a plate engaged with said jaws and arranged to hold said pivoted arm in alinement with the slidable arm.

5. The combination with a vehicle axle, of a bracket, wings projecting from one end portion of said bracket in spaced relation to each other, said wings being adapted to engage the axle, an extension on said end portion of the bracket, an arm slidably mounted on said extension, said arm having a jaw on one end, a holding arm pivoted to the other end of said bracket and overlapping the same, the other end of said arm having a jaw, and a plate supported by the jaws of said arms, the wings of the bracket and over-lapping portion of the pivoted arm being arranged to engage the axle at the open end of the bracket.

6. The combination with a vehicle axle, of a bracket, wings projecting from one end portion of said bracket in parallel spaced relation to each other, said wings being adapted to engage the axle, an extension on said end portion of the bracket, an arm slidably mounted on said extension, said arm having a jaw on one end, a holding arm pivoted to the other end of said bracket and overlapping the same, the other end of said arm having a jaw, and a plate supported by the jaws of said arms, said slidable arm being arranged to force said plate in frictional engagement with the pivoted arm.

7. The combination with a vehicle axle, of a bracket adapted to engage said axle, a slidable holding arm carried by one end of said bracket one end of said arm including a jaw, an oscillating holding arm carried by the other end of said bracket and a plate disposed between the jaws of the arms, said slidable arm being adapted to constantly urge said plate in engagement with the oscillating arm to prevent the latter from permitting disengagement of the bracket from the axle.

In testimony whereof I hereunto affix my signature.

GLENN L. DEWEY.